United States Patent Office 3,790,625
Patented Feb. 5, 1974

3,790,625
POLY(GLYCIDIC ACID) AND METHODS OF PREPARATION THEREFOR
Herwart V. Vogt, Grosse Ile, and Pauls Davis, Gibraltar, Mich., assignors to BASF Wyandotte Corporation, Wyandotte, Mich.
No Drawing. Filed Aug. 24, 1970, Ser. No. 66,618
Int. Cl. C07c 59/12
U.S. Cl. 260—535 P
3 Claims

ABSTRACT OF THE DISCLOSURE

Polymers of glycidic acid are prepared by either (1) oxidation of poly(glycidol) or (2) homopolymerization and ion exchange of potassium glycidate. The polymers of glycidic acid [poly(glycidic acid)] are useful as intermediates in the preparation of alkali soluble resins, thickeners, suspending and dispersing agents, and as flocculants.

BACKGROUND OF THE INVENTION

(1) Field of the invention

The present invention pertains to polycarboxyl-containing compounds and methods of preparation therefor. More particularly, the present invention pertains to alkylene oxide-based polycarboxylic compositions and methods of preparation therefor. Even more particularly, the present invention relates to polymers of glycidic acid and methods of preparation therefor.

(2) Prior art

Polycarboxylic acids and their utility have long been known in the art. However, the art is constantly providing new and novel polycarboxylic acids as well as new compositions derived therefrom. Oftentimes, however, these new acids require tedious and difficult procedures and processes for their preparation. Thus, ideally, it is advantageous within this art to provide new and novel polycarboxylic acids, as well as compositions derived therefrom, which are prepared by simple techniques.

SUMMARY OF THE INVENTION

The present invention provides new polyacids or polycarboxylic compounds, poly(glycidic acids), characterized by recurring units defined by the formula:

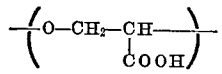

These new polymers are useful as thickeners; flocculants; suspending, dispersing, and chelating agents; and as valuable intermediates in the preparation of alkali soluble resins.

The present polymers of glycidic acid are prepared by either (1) the oxidation of poly(glycidol) or (2) the homopolymerization and ion exchange of potassium glycidate.

For a more complete understanding of the present invention reference is made to the following detailed description and examples thereof.

DESCRIPTION OF THE PREFERRED EMBODIMENTS

In accordance with the present invention there is provided polymers of glycidic acid, poly(glycidic acid), characterized by recurring units defined by the formula:

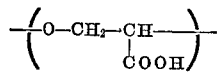

These polymers, as hereinbefore noted, are prepared by either (1) the oxidation of poly(glycidol) or (2) the homopolymerization and ion exchange of potassium glycidate.

A first embodiment of the present invention provides for the preparation of poly(glycidic acid) by the oxidation of a poly(glycidol). Poly(glycidol) is a polymer of glycidol which has either a linear or branched structure, according to the method of preparation, and is characterized by recurring units defined by either of the formulas:

(I)

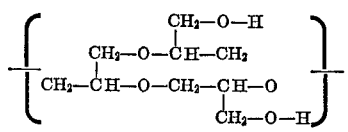

or (II)

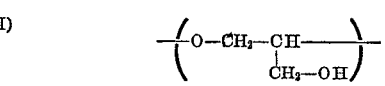

These polymers (I) are advantageously prepared by either (a) the homopolymerization of glycidol or (b) the copolymerization of glycidol and alkylene oxide. These polymers are more particularly described in copending United States patent application Ser. No. 66,620, filed Aug. 24, 1970, now abandoned, and entitled Polyglycidol and Preparation Thereof From Glycidol, the disclosure of which is hereby incorporated by reference.

The polymers (II) are prepared by either the saponification or hydrolysis of poly(glycidol acetate) and are more particularly described in copending U.S. patent application Ser. No. 66,621, filed Aug. 24, 1970, now abandoned, and entitled "Polyglycidol and Preparation Thereof From Polyglycidol Acetate"; the disclosure of which is hereby incorporated by reference.

The poly(glycidol acetate) utilized to prepare the poly(glycidol) (II) employed herein is a composition of matter characterized by recurring units defined by the formula:

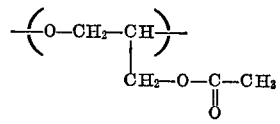

These polymers, which are prepared by either (1) the reaction of epichlorohydrin and an acetate salt, (2) the copolymerization of alkylene oxide and glycidol acetate monomer, or (3) the homopolymerization of glycidol acetate monomer, are more particularly described in copending U.S. patent application Ser. No. 66,619 and 66,622, both filed Aug. 24, 1970, and both entitled "Polyglycidol Acetate," the disclosures of which are, also, hereby incorporated by reference.

It is not critical hereto which polyglycidol is employed herein. Indeed any of the above-identified polyglycidols are efficaciously employed herein.

The oxidizing agent employed in the present invention is preferably an inorganic acid, such as, for example nitric acid, concentrated sulfuric acid, chromic acid, and the like.

Other inorganic oxidation agents suitable for use in the present invention include, for example, hydrogen peroxide, potassium permanganate and the like.

Preferably, nitric acid is employed as the oxidizing agent.

Using nitric acid as exemplifying a suitable oxidation agent and a polyglycidol of Formula II, the oxidation reaction proceeds in accordance with the following equation:

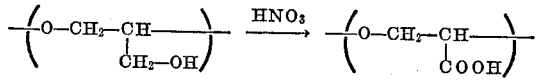

The mechanism of oxidation appears to proceed in accordance with the following equation:

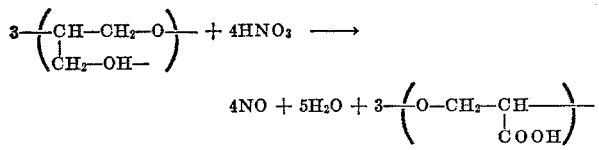

The nitric acid is, of course, reduced to various oxides of nitrogen depending on the reaction conditions. If the oxides are not reduced past the level of nitric oxide, recovery and recycle of the nitric acid is possible through air oxidation. Thus, under suitable conditions the reaction can be considered as essentially an air oxidation in which nitric acid and oxides of nitrogen are used as carriers of the oxygen.

The polymers of glycidic acid are prepared in accordance herewith by contacting the poly(glycidol) with the oxidation agent. Generally from about 74 to 100 parts by weight of poly(glycidol) and from about 80 to 100 parts by weight of nitric acid (calculated as 100%) is sufficient. Preferably, from about 74 to 80 parts poly(glycidol) and from about 80 to 84 of nitric acid are employed.

The reaction commences by gently heating at atmospheric pressure, the poly(glycidol) in contact with the oxidation agent. Generally, a temperature ranging from about 0 to 150°, and usually from about 60° to 100° is sufficiently to initiate the reaction. After about 1 to 16 hours, the reaction is completed.

The polymer is recovered by treating the reaction product with a minor amount of hydrogen peroxide and evaporating the resulting polymer solution to dryness.

The poly(glycidic acid) compositions of the present invention are readily converted to acid anhdrides by heating the polymer to a temperature ranging from about 125 to 150° C., thereby providing an insoluble, crosslinked polymer. Treatment of the anhdyride with a suitable saponifying agent, such as potassium hydroxide, regenerates the original poly(glycidic acid).

Alternatively, the present invention provides for the preparation of poly(glycidic acid) by the homopolymerization of an alkali metal glycidate, such as sodium glycidate, potassium glycidate, or the like, and the subsequent ion exchange thereof. The homopolymerization is advantageously conducted in aqueous solution and in the presence of a suitable catalyst and ion exchanger in accordance with the following equation:

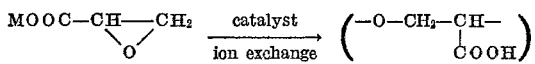

wherein M is an alkali metal.

For purposes of the following explanation it is assumed that the alkali metal is potassium. However, it is to be understood that the other alkali metals can be employed herein with equal efficacy.

The alkali metal glycidate, e.g. potassium glycidate, employed herein is prepared from β-chlorolactic acid, a composition corresponding to the formula:

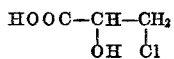

by conventional epoxide formation reactions of halohydrins. The epoxide formation reaction generally consists of reacting the halohydrin in water and/or other suitable organic solvents, such as methanol and the like, and in the presence of suitable alkali base. This reaction proceeds at a temperature ranging from about 10 to 25° C., and preferably from about 15 to 20° C. To prepare the potassium glycidate exemplified herein, the alkali base utilized is potassium hydroxide. The formation of potassium glycidate from the halohydrin, β-chlorolactic acid, in the presence of potassium hydroxide proceeds in accordance with the following equation:

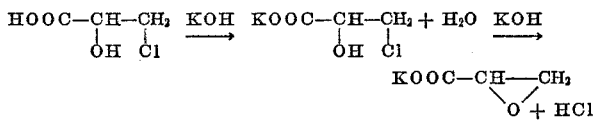

The potassium glycidate is recovered by conventional separation techniques.

Generally, from about 0.4–0.5 mole of β-chlorolactic acid per mole of potassium hydroxide is employed. Preferably, from about 0.5 to 0.45 mole of β-chlorolactic acid per mole of potassium hydroxide is utilized.

β-Chlorolactic acid, in turn, is derived from the oxidation of an epichlorohydrin with a suitable oxidation agent, such as those disclosed above. The preparation of β-chlorolactic acid is illustrated, using nitric acid as exemplifying a suitable oxidation agent as follows:

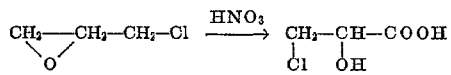

It is thus seen that the poly(glycidic acid) of the embodiment is prepared in accordance with the following sequence of reactions:

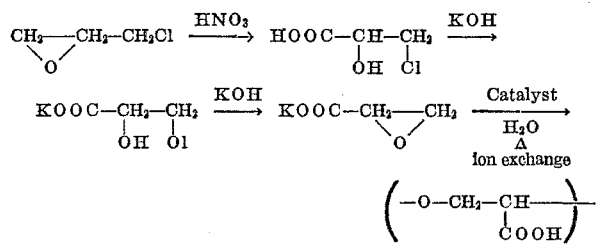

As mentioned above, the homopolymerization is conducted in aqueous solution and in the presence of a suitable catalyst and and ion exchange medium. Suitable catalysts as contemplated herein are the tertiary amines, either aliphatic or aromatic as well as heterocyclic tertiary amines.

The preferred catalyst is 1,2,4 - trimethylpiperazine. Generally, from about 0.1 to 1.0 gram of catalyst per 100 grams of potassium glycidate is sufficient to catalyze the homopolymerization.

The potassium glycidate monomers are homopolymerized at atmospheric pressure, at a temperature ranging from about 50° to 150° C. and for a period ranging from about ½ to 50 hours.

The polymer is recovered by passing the aqueous solution through an ion exchange medium, which is preferably a cation exchange resin, to remove the potassium and thereafter stripping the effluent to a constant weight.

The resulting polymers are tan colored, slightly brittle or very viscous, having a carboxylic group content ranging from about 10 to 50% and generally having a $pK_a$ of approximately 3.5, and a molecular weight ranging from about 100 to 100,000.

A more complete understanding of the present invention can be obtained from reference to the following examples thereof, which are not to be construed as unduly limiting the present invention. In the examples, all parts are by weight, absent indications to the contrary.

EXAMPLE I

This example illustrates the preparation of poly(glycidic acid) by the oxidation of polyglycidol.

(A) Preparation of polyglycidol

To a suitable reaction vessel equipped with reflux and distillation apparatus was charged 2 parts of sodium metal, 158.4 parts methanol and 200 parts of poly(glycidol acetate). The polyglycidol acetate employed in this example is a composition of matter more particularly described in U.S. patent application Ser. No. 66,621, entitled "Polyglycidol and Preparation Thereof From Polyglycidol Acetate," filed Aug. 24, 1970, now abandoned, and in particular in Example VI, part A thereof.

The charge was reflux for two hours and was followed by the slow distillation of the solvent. The remaining product in the vessel was then acidified to litmus acid with 10 ml. concentrated HCl. The mixture was then stripped to 35 mm. Hg at 100° C. There was recovered 85 parts of polyglycidol.

(B) Oxidation of polyglycidol

Into a 4-liter beaker seated on a steam bath was added 74 parts of the polyglycidol from part A, above, and 120 parts of 70% nitric acid (84 parts of 100% $HNO_3$) which were accordingly heated to about 60° C. After a few seconds of exposure to the heat, nitric oxide was emitted from the beaker and oxidation commenced. Air was then bubbled through the mixture and the heat was maintained. After about 1 hour, a mixture of 25 parts of polyglycidol (same source as before) and 40 parts of 70% nitric acid was added to the beaker. Again, on warming, nitric oxide was emitted. After about 2 more hours of heating on the steam bath, the oxidation terminated and a yellow, taffy-like polymer was recovered. This polymer was then transferred to an evaporating dish, dissolved in about 100 parts of distilled water, and heated for about 2 hours on the steam bath. Thereafter, 5 ml. of 30% hydrogen peroxide was added to the solution of distilled water and polymer and the resulting solution was heated on the steam bath for about 16 hours.

A slightly brittle foam was recovered from the evaporating dish. To ensure dryness of the product, the foam was stored for 24 hours over potassium hydroxide and and in the presence of a vacuum. After the second 24-hour period elapsed, 90 parts of light tan hydroscopic slightly tacky product, identified by IR spectroscopy as a poly(glycidic acid), was recovered.

EXAMPLE II

This example illustrates the preparation of poly(glycidic acid) by the homopolymerization of potassium glycidate.

(A) Preparation of β-chlorolactic acid

Into a suitable reaction vessel containing 175 parts of $HNO_3$ (70%) and maintained at −20° C. was carefully added 50 parts of epichlorohydrin. During this addition the temperature in the vessel rose to about 50° C. When the temperature in the vessel started to drop, the contents thereof was placed in an evaporating dish disposed atop a steam bath maintained at about 100° C. After about 2–3 minutes exposure to the steam bath oxidation occurred as evidenced by the emission of brown fumes. After about 10 minutes a second nitric acid-epichlorohydrin solution, as prepared above, was added to the evaporating dish. This addition was then repeated with two more additional nitric acid-epichlorohydrin solutions.

After the reaction was completed, the resulting brown, oily product was heated on the steam bath for two more additional hours; cooled to room temperature and then pumped at 1 mm. Hg in a desiccator.

Using 200 parts of chloroform, 229 parts of raw product were extracted and recovered. This raw product was then chilled for 48 hours at 0° C. whereupon a crystalline slurry was obtained.

This slurry was then filtered through a coarse, sintered glass funnel; washed with 100 mls. of methylene chloride and the solid was removed from the mother liquor. The mother liquor was then stripped at 25 mm. Hg at 100° C. and a dark, viscous oil, β-chlorolactic acid was recovered in a yield of 75 parts.

(B) Preparation of potassium glycidate

In a suitable vessel 70 parts of potassium hydroxide were dissolved in 250 ml. of methanol and cooled to 20° C. To the vessel was then added 67 parts of the β-chlorolactic acid from part A, above, dissolved in 100 ml. of methanol. This addition was controlled to maintain the temperature in the vessel at about 15 to 20° C. After the addition was completed the contents of the vessel were allowed to warm up to room temperature whereat they were stirred for one hour. After the one hour of stirring at room temperature the contents of the vessel were then filtered through a fine sintered glass funnel and washed with 200 ml. cold methanol and the resulting precipitate and methanol solution were separated.

To the methanol solution was then added 400 ml. diethyl ether which caused the formation of a precipitate and an oil. The precipitate and oil were then cooled to about 5° C. for about 15 hours. The precipitate was then redissolved in ethanol and diethyl ether was then added thereto and the contents were chilled as before.

A yield of 14 parts of white powdery crystals identified as potassium glycidate was obtained.

(C) Preparation of poly(glycidic acid)

Into a suitable reaction vessel was charged 10 parts of the potassium glycidate from part B, above, 3 drops of water and 3 drops 1,2,4-trimethylpiperazine. The vessel was then sealed and heated on a steam bath at 100° C. for about 40 hours. When the vessel was opened there was obtained a light tan, extremely viscous product. This product was then dissolved in approximately 100 parts of distilled water and passed through a washed 50 ml. bed of cation exchange resin. The effluent was then washed with an additional 100 ml. of distilled water; stripped at 20 mm. Hg at 100° C., and then at 1 mm. Hg at 100° C.

The product yield, which was isolated as a very viscous tan oil, was 4 parts of a product identified as poly(glycidic acid).

EXAMPLE III

This example illustrates the preparation of poly(glycidic acid) by the oxidation of a poly(glycidol).

Into a suitable reaction vessel were added 150 parts of 40% nitric acid and 80 parts of a poly(glycidol). The polyglycidol employed was prepared in accordance with Example III of copending U.S. patent application Ser. No. 66,621, filed Aug. 24, 1970, now abandoned, and entitled "Polyglycidol and Preparation Thereof From Polyglycidol Acetate." The contents of the vessel were thoroughly mixed until a dark brown homogeneous mixture was obtained.

The vessel was then placed on a stream bath maintained at 55° C. and a trace amount of sodium nitrite was added to the contents thereof. After a few minutes oxidation commenced as evidenced by the evolution of nitrogen dioxide. The vessel was kept on the steam bath for about 3½ hours until the contents thereof had evaporated to dryness. The product recovered from the vessel was then dried to a constant weight at 60° C. and at 1 mm. Hg.

The final product, identified as poly(glycidic acid) had an average carboxyl content of 10.6%.

EXAMPLE IV

This example illustrates the preparation of poly(glycidic acid) by the oxidation of poly(glycidol).

Into a four liter beaker was added 100 parts of nitric acid (70%) and 100 parts of a poly(glycidol) prepared in accordance with Example V, part B thereof, of copending U.S. patent application Ser. No. 66,621, filed Aug. 24, 1970, now abandoned, and entitled "Polyglycidol and Preparation Thereof From Polyglycidol Acetate." The beaker was then placed on a steam bath maintained at 60° C. After the contents of the beaker were warmed, oxidation began with nitrogen dioxide being evolved.

After oxidation ceased, air was passed through the beaker to entrain any fumes. Heating was continued for about 15 hours on the steam bath. Thereafter, the contents of the beaker were transferred to a vacuum desiccator and were stored therein for two days over KOH pellets.

Ninety-eight parts of a brown viscous oil, identified as as poly(glycidic acid), having an average carboxyl content of 7.6% were recovered.

What is claimed is:

1. A process for the preparation of a polymer of glycidic acid, the polymer being characterized by recurring units defined by the formula:

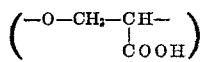

the process comprising:
 (a) homopolymerizing in an aqueous solution an alkali metal glycidate monomer corresponding to the formula:

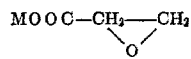

wherein M is an alkali metal salt in the presence of a tertiary amine catalyst and at a temperature from about 50 to 150° C., (b) passing the polymer solution through an ion exchange medium, and
 (c) stripping the effluent to a constant weight.

2. The process of claim 1 wherein the catalyst is 1,2,4-trimethylpiperazine.

3. The process of claim 1 wherein the potassium glycidate is prepared by forming an epoxide from β-chlorolactic acid with alkali metal hydroxide and wherein the β-chlorolactic acid is the oxidation reaction product of epichlorohydrin and an inorganic oxidation agent.

References Cited
UNITED STATES PATENTS

| | | | |
|---|---|---|---|
| 2,369,640 | 2/1945 | Barnum | 260—535 P |
| 2,659,754 | 11/1953 | Ash et al. | 260—535 P |

LORRAINE A. WEINBERGER, Primary Examiner

P. J. KILLOS, Assistant Examiner

U.S. Cl. X.R.

260—348.6, 488 J, 535 H, 615 R